United States Patent

Kaschulla et al.

[11] Patent Number: 6,081,520
[45] Date of Patent: *Jun. 27, 2000

[54] METHODS AND ARRANGEMENTS FOR INVOLVING REMOTE COMMUNICATION SYSTEMS IN A CORPORATE NETWORK

[75] Inventors: Heinz Kaschulla; Uwe Krueger, both of Essen, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,342

[22] Filed: Mar. 12, 1997

[30] Foreign Application Priority Data

Mar. 14, 1996 [DE] Germany ............ 196 10 069

[51] Int. Cl.[7] .................................................. H04L 12/50
[52] U.S. Cl. .................... 370/357; 370/410; 379/93.02; 379/229
[58] Field of Search ..................... 370/522, 524, 370/410, 230, 357, 422, 426; 379/93.02, 229, 225, 156, 207; 395/200.57, 200.58, 200.59

[56] References Cited

U.S. PATENT DOCUMENTS

| 5,212,691 | 5/1993 | Hokari ........................ 379/220 |
| 5,345,502 | 9/1994 | Rothenhofer ............... 379/207 |
| 5,440,617 | 8/1995 | Rynaski et al. ............. 379/95 |
| 5,455,855 | 10/1995 | Hokari ........................ 379/229 |

FOREIGN PATENT DOCUMENTS

| 42 25 240 A1 | 1/1993 | Germany . |
| 42 30 561 A1 | 5/1993 | Germany . |
| 43 29 172 A1 | 3/1995 | Germany . |

*Primary Examiner*—Hassan Kizou
*Assistant Examiner*—Mitchell Slavitt
*Attorney, Agent, or Firm*—Hill & Simpson

[57] ABSTRACT

Given a connection setup from a private, remote communication system (AKS), indicated selection information (wi) is evaluated and, dependent on the evaluation result, a communication connection (KV) is set up to an ISDN communication network (ISDN) or a communication connection (KV) is set up via the ISDN communication network (ISDN) to a corporate network (CN). A "Least Cost Routing" evaluation enables a cost-beneficial routing of communication connections (KV) initialized via a remote communication system (AKS).

24 Claims, 2 Drawing Sheets

METHODS AND ARRANGEMENTS FOR INVOLVING REMOTE COMMUNICATION SYSTEMS IN A CORPORATE NETWORK

BACKGROUND OF THE INVENTION

Internal company or, respectively, private, cooperating communication networks (known in the technical field as corporate networks) are formed by connecting private communication systems that realize telephone and data services, especially telecommunication switching systems. Private communication terminal equipment (telephone and data terminal equipment) can be connected to the communication systems. The connection of the private communication systems (for example, HICOM private branch exchanges of Siemens AG) preferably ensues via a private network on private property and, if not possible via a private network, via dedicated connections of a public communication network (for example, the ISDN or, respectively, Euro-ISDN communication network). Insofar as no private communication network is available, the linking of remote communication systems to a corporate network currently ensues via dedicated connections since a private selection information strategy can usually not be employed given dialed connections via a public switched communication network. This means that remote communication systems with few connected communication terminal equipment, i.e. low traffic flow, can only be linked to a corporate network with high economic outlay (leasing at least one permanent connection of a public communication network).

When the remote communication system represents a customer-associated communication system, for example the remote communication system and the private communication network are assigned to different companies, communication connections directed to the corporate network from the communication terminal equipment connected to the remote communication system are usually set up or, respectively, cleared down via the public communication network according to the signaling thereof and, potentially, a suffix dialing. A utilization of, in particular, the potentially more cost-beneficial private transmission network realized in the corporate network is not possible.

SUMMARY OF THE INVENTION

It is an object of the present invention to reduce the economic outlay for linking private, remote communication systems to a corporate network.

An important aspect of the present invention is that selection information, that is, the communicated call numbers, output by a remote communication system or, respectively, communication terminal equipment in a call setup is interpreted at the remote communication system (advantageously using a network access means), and, dependent on the interpretation result, a connection is set up either directly to the public ISDN communication network or to the private communication network via the ISDN communication network. For a setup of a communication connection to the private communication network, additional predetermined selection information is derived from the indicated selection information, that is, the communication connection is switched to predetermined communication terminals of the public ISDN communication network. The selection information indicated in the call setup are inventively communicated to the private communication network in a selection information sub-field of the signaling. Advantageously, the indicated selection information is communicated in the selection information sub-field (referred to as sub-addressing in the Standard) of the Euro-ISDN signaling DSS1. According to Standard DSS1, the selection information sub-field has 20 bytes.

Another important advantage of the present invention is that, as a result of the interpretation of the indicated selection information at the remote communication system, the respective communication connection is switched (dependent on the greatest variety of criteria) either directly into the public ISDN communication network or, via this, to a private or, respectively, corporate network. The "internal call number" represents an important criterion. When internal selection information or, respectively, a call number is recognized in the network access means, then a call setup to the private or, respectively, corporate network is initiated. Predetermined selection information stored in the network access means is employed for this purpose. An incoming connection is switched to a specific communication terminal of the ISDN communication network by this predetermined selection information. This communication terminal is advantageously connected to a private or, respectively, corporate network via a network access means. The indicated, that is, internal selection information or, respectively, call number of a communication terminal equipment that is connected to the remote communication system and that initializes the communication connection is communicated in the "sub-addressing" field of the Euro-ISDN signaling DSS1in the course of the connection setup.

Advantageously, the selection information of the calling communication terminal equipment connected to the remote communication system that is fundamentally communicated in the framework of the ISDN signaling in every connection setup is checked in view of a communication network access authorization to at least one, first communication network. The communication of the selection information of the calling communication terminal equipment connected to the remote communication system ensues as source selection information or, respectively, call numbers in the framework of the ISDN signaling. In the Euro-ISDN Standard, this source selection information is defined as Calling Line Identification and Presentation CLIP that respectively indicates a communication terminal equipment initializing a communication connection and additionally indicates whether this selection information is to be presented or, respectively, displayed at the called communication terminal equipment.

In order to assure that unauthorized parties do not obtain access to a corporate network, identification information (advantageously stored and inserted in the network access means) is additionally communicated in the selection information sub-field of the signaling. The identification information is checked in view of its authorization in the corporate network (advantageously, in the network access means) and the incoming communication connection is either forwarded to the corporate network or rejected dependent on the result of the check. The communicated identification information is thereby compared to information stored in the network access means, and a call setup to the corporate network is initiated given coincidence thereof.

The call charge interpretation represents a further important criterion for the evaluation of the selection information indicated by the remote communication system. To this end, further selection information or, respectively, ISDN selection information or, respectively, call numbers are stored at the remote communication system (advantageously, in the network access means), the allocated communication connection being switched not via the ISDN communication network but via the corporate network for cost or, respectively, call charge reasons when they appear in the indicated selection information. The further selection information is essentially a mater of ISDN selection information that is allocated to respectively predetermined geographical areas such as countries, states, cities, etc.

Upon appearance of such geographical area-specific selection information, the respective incoming communication connection is switched via the ISDN communication network to the closest corporate network and is forwarded therein to the respective geographical destination area via, for example, cost-beneficial private networks. In the destination area, the respective communication connection can again be switched into the ISDN communication network and be forwarded therein to an ISDN communication terminal equipment. The ISDN selection information must be carried along in the corporate network and inserted in the geographical destination area according to the ISDN signaling. This measure, referred to as "least cost routing" in the technical field, is especially advantageous for those communication connections that can be routed more cost-beneficially via private networks or, respectively, corporate networks than via the public ISDN communication network. "Least cost routing" is especially advantageously applied given international communication connections.

Given a routing of an internal communication connection, the indicated selection information communicated in the selection information sub-field is evaluated in the corporate network (advantageously, in the network access means). After the determination or, respectively, recognition of the communicated, indicated selection information as selection information, the respective communication connection to the appertaining communication terminal equipment of the first communication network or, respectively, corporate network is routed with each information.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
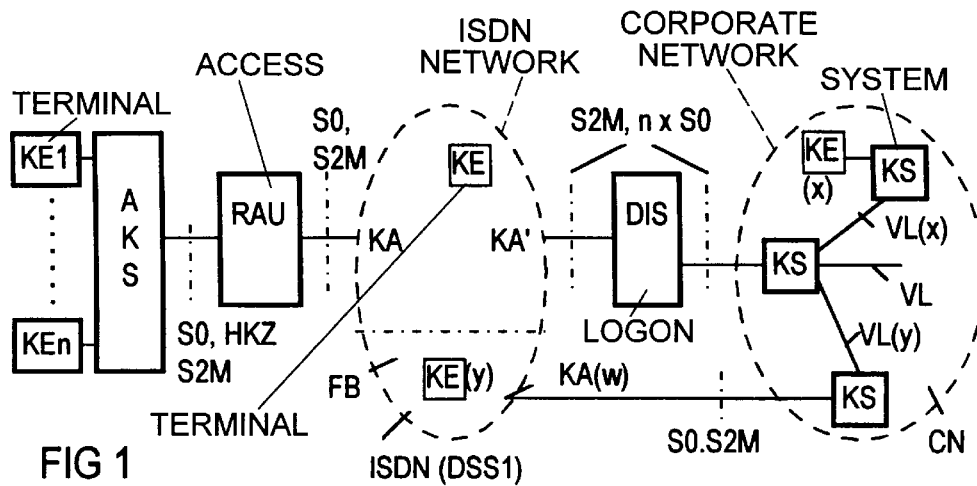
FIG. 1 is a block circuit diagram of the inventive communication arrangement.

FIG. 1 shows an ISDN communication network ISDN and a private network or, respectively, a corporate network CN (respectively indicated by broken lines). The physical and procedural properties of communication terminals KA of the ISDN communication network ISDN are configured according to the ETS Standard ETS 300 195, "Integrated Services Digital Network (ISDN); Digital Subscriber Signaling System No. 1 (DSS1)". This ISDN communication terminal KA known in the technical field as Euro-ISDN communication terminal (DSS1) comprises a performance feature "sub-addressing" with which information transmission in the signaling channel or, respectively, in the D-channel is possible in the connection setup of a communication connection KV (see FIG. 2). Information with a maximum length of 20 bytes, that is, 115 place ISDN selection information as well, can be communicated in this selection information sub-field or, respectively,"sub-addressing" field.

The corporate network CN represents, for example, a company-internal, private communication network that is formed by communication systems KS (by way of example, three communication system KS are shown) that are meshed with one another. With respect to the physical and procedural properties, the corporate network CN is realized, for example, according to the ISDN-oriented Cornet protocol of Siemens AG. In addition to the standardized ISDN properties or, respectively, performance features, the Cornet protocol comprises other performance features that go beyond the performance feature spectrum of public ISDN communication networks ISDN.

A network access means RAU (Remote Access Unit) is connected to an ISDN base terminal S0 of the ISDN communication network. Such an ISDN basic terminal S0 comprises two message channels B with a respective transmission rate of 64 kbit/s and a signaling channel D with a transmission rate of 16 kbit/s. The network access means RAU comprises a further, identically realized ISDN basic terminal S0 that is connected to an ISDN basic terminal S0 of a remote communication system AKS. The plurality of ISDN basic terminals S0 is to be adapted dependent on the traffic volume between the remote communication system AKS and the ISDN communication network ISDN (for example, three or four) or, alternatively, the network access means RAU can be connected to the remote communication system AKS via an ISDN primary interface S2M. The ISDN primary interface comprises 30 message channels (N) and a signaling channel D. Alternatively, analog interfaces HKZ can be realized for the connection of traditional, remote communication systems AKS, whereby at least two interfaces HKZ operating according to the known main terminal characteristic (HKZ) signaling method are to be provided in order to realize ISDN Communication connections KV.

The remote communication system AKS, for example, represents another company-owned private branch exchange, whereby the operators of the corporate network CN and of the remote communication system can be the same or different. Let it be assumed for the exemplary embodiment that the remote communication system AKS or, respectively, the communication terminal equipment K1 . . . n connected thereto can use trunk lines VL of the corporate network CN. Such a use is especially advantageous when call charge savings thereby derive compared to a routing in or, respectively, via the ISDN communication network. Consequently, such a use is only meaningful for long-distance connections, i.e. not given connections in the local area. This means that a communication connection KV in the local area is always routed via the ISDN communication network ISDN (indicated by a dot-dash line) and a long-distance connection is routed to the corporate network CN either in the ISDN communication network ISDN or via ISDN communication network ISDN dependent on an evaluation of call charges.

To this end, the ISDN communication network ISDN is connected to the corporate network CN via a network logon means DIS (Dial in Server). The communication terminals KA of the ISDN communication network ISDN as well as of the corporate network CN are respectively realized by an ISDN primary terminal S2M. The ISDN primary terminal S2M comprises 30 message channels of 64 kbit/s each and a signaling channel D with 16 kbit/s. This ISDN primary terminal S2M comprising a plurality of message channels B is advantageously used given involvement of a plurality of remote communication systems AKS to the corporate network CN. Alternatively, n basic terminals S0 (for example, five) can be realized given low traffic volume.

Figure 2A:
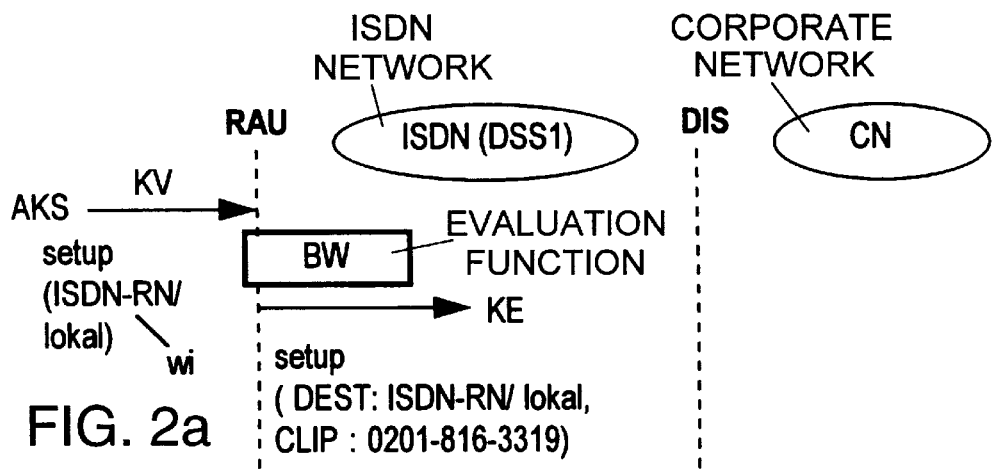
FIGS. 2 shows flowcharts depicting operation of the FIG. 1 arrangement.
Figure 2B:
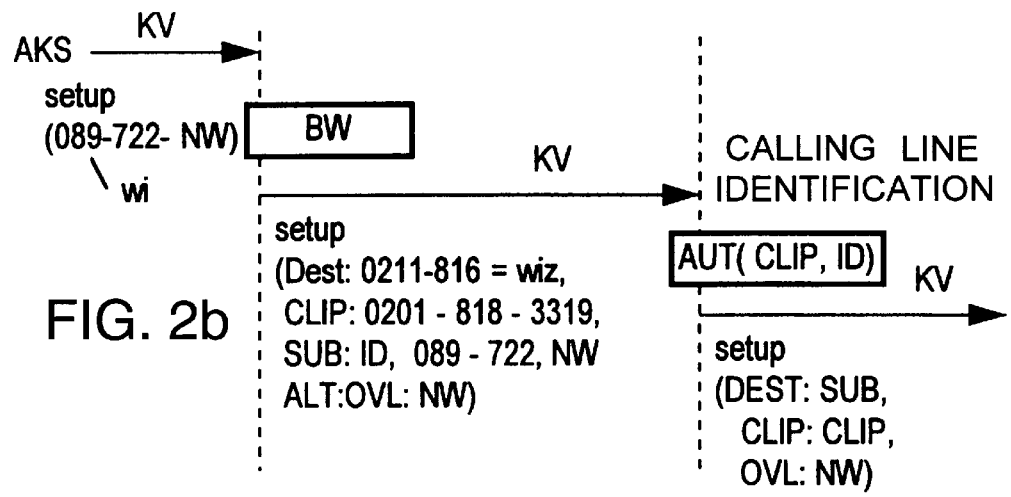
Figure 2C:
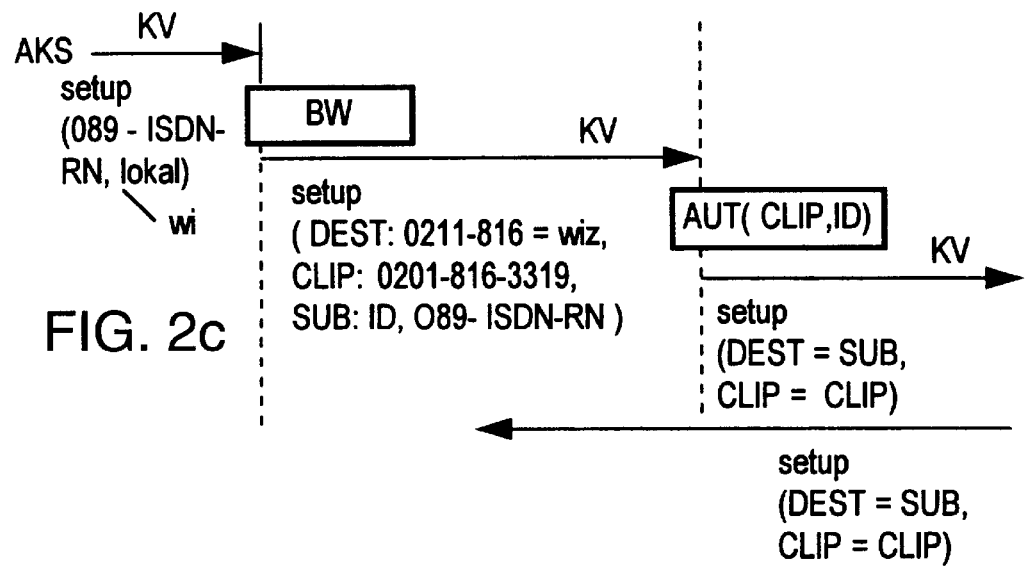

FIGS. 2a, 2b and 2c show three different connection setup versions dependent on the selection information wi indicated by one of the communication terminal equipment KE1 . . . n. In the version shown in FIG. 2a, a connection setup SETUP to the network access means RAU shown in FIG. 1 is initiated via the remote communication system AKS by one of the communication terminal equipment KE1 . . . n connected to the remote communication system AKS. An ISDN selection information ISDN-RN whose allocated ISDN communication terminal equipment KE is located in the same geographical or, respectively, local area as the ISDN communication system (for example in the same city neighborhood) as the remote communication system AKS is indicated as destination selection information wi or, respectively, call number. The indicated selection information wi or, respectively, ISDN call number ISDN-RN is evaluated by an evaluation function BW, that is, given no coincidence in the comparison of the indicated selection information wi with selection information wi stored in the access means RAU, a determination is made that the connection setup of the incoming communication connection KV is to be forwarded unmodified to the ISDN communication network ISDN. To this end, a connection setup SETUP to the ISDN communication network ISDN is initiated, whereby the indicated ISDN call number ISDN-RN is inserted as destination selection information DEST and a calling line identification and presentation (CLIP) (the abbreviation CLIP shall be used below) is inserted as selection information defining the originating communication terminal equipment K1 . . . n according to the standard ETS 300 195. In the exemplary embodiment, the CLIP stored in the remote communication system AKS for every connected communication terminal equipment KE1 . . . n is represented, for example, by ISDN selection information 0201-816-3319. The initiated connection setup of the communication connection KV is continued in the ISDN communication network ISDN, and, after communication of a through-connect message (not shown), the communication connection KV is through-connected both in the network access means RAU as well as in the remote communication system AKS. The connection cleardown ensues according to the above-recited ETS standard.

FIG. 2b shows a connection setup alternative wherein the connection setup SETUP is initiated with a destination selection information wi that is composed of a long-distance selection information 089, of a regional selection information 722 and of a suffix dialing information NW. As a result of comparison of the incoming long-distance and regional selection information 089–722 to selection information wi stored in a stored selection information table TAB (see FIG. 3), the evaluation function BW in the network access means RAU recognizes that the communication terminal equipment KE allocated to this selection information wi is arranged in the corporate network CN (that is, an internal selection information wi is involved), and a communication connection KV is routed via the ISDN communication network ISDN in the local area and via the corporate network in the long-distance area (from the regional area Dusseldorf to the destination area Munchen in the exemplary embodiment). Over and above this, a routing via the corporate network CN is more cost-beneficial than a long-distance routing via the ISDN communication network ISDN because of permanent trunk lines VL that are not yet in full use (in the exemplary embodiment, for example, permanent trunk lines VL from Düsseldorf to München) known in the technical field as "Least Cost Routing". In order to effect a routing of the respective communication connection KV into the corporate network, a connection setup SETUP to a predetermined ISDN communication terminal KA (S0) is initiated in the network access means RAU. To this end, for example, selection information 0211-816 is prescribed as destination selection information DEST. This selection information corresponds to additional selection information wiz that is stored in the network access means RAU. The CLIP (see FIG. 2a) is again provided as originating call number. The indicated selection information wi is inserted into the selection information sub-field SUB (the sub-addressing field in the Euro ISDN standard). The indicated selection information wi are thereby usually completely communicated in the sub-addressing field SUB or the suffix dialing or, respectively, the suffix dialing numbers are communicated according to the overlap sending OVL method recited in the ISDN Standard (indicated by the designation ALT: OVL: NW in FIG. 2b). Particularly given time delays in the input of the suffix dialing information NW, the suffix dialing information NW are thereby transmitted transparently according to the overlap sending method in information fields of the "sub-addressing field" provided therefor.

The rest of the connection setup SETUP is conducted via the ISDN communication network ISDN to the network logon means DIS, whereby the indicated information are communicated. An authorization check is implemented in the network logon means DIS using the CLIP. To this end, the communicated CLIP is compared to CLIPs stored in tables TAB and, given a coincidence, the connection setup is continued. This means that only authorized communication connections KV are forwarded into the corporate network CN. In order to achieve an additional access protection, identification information ID can be additionally sent in the "sub-addressing" field, this being compared to stored identification information in the network logon means DIS, and, given a coincidence, the connection setup is forwarded into the corporate network CN. The connection setup SETUP is implemented with the call numbers 089–722-NW communicated in the "sub-addressing" field as destination selection information DEST together with the communicated CLIP or, alternatively, the suffix dialing information NW with the assistance of the overlap sending function OVL. In the corporate network CN, the communication connection KV is routed via the permanent connection VL(x) to the appertaining private communication system and is routed from the latter to the communication terminal equipment KE (x) defined by the suffix dialing information NW.

In the version of FIG. 2c, the remote communication system AKS forwards a selection information wi, whereby the addressed communication terminal equipment KE is arranged in the long-distance area of the ISDN communication network ISDN. In FIG. 1, the communication terminal equipment arranged in this long-distance area FB is referenced KE (y).

A determination is made in the network access means RAU with the evaluation function BW, that is, by comparing stored to indicated destination selection information wi, that the communication connection KV is more cost-beneficially routed via the corporate e network CN than via the ISDN communication network. As already explained, trunk lines VL that are not in full use or better fees in the corporate network CN can effect the cost reduction. Consequently, a connection setup SETUP is initiated with the same destination selection information DEST and the same CLIP as in FIG. 2a). The indicated destination selection information wi is either completely communicated in the sub-addressing field SUB or by use of the overlap sending method OVL (in the exemplary embodiment, 089 and a local ISDN call number ISDN-RN). The connection KV incoming to the network logon means DIS is checked using the CLIP with respect to its authorization AUT, and a connection setup SETUP to the corporate network is subsequently initiated. The selection information wi communicated in the sub-addressing field SUB is inserted as destination selection information, and the CLIP is inserted as originating selection information or, respectively, call number. Using these two information wi, CLIP, the communication connection KV is handed over to the communication system KS and, for example via a further ISDN basic terminal S0 or, respectively, an ISDN primary terminal S2M, is routed from the latter to a communication terminal KA(w) in the long-distance area FB of the ISDN communication network ISDN. In the latter, the communication connection KV is forwarded to the addressed communication terminal equipment KE(y), whereby the connection setup SETUP is initiated with the destination information DEST and the originating selection information or, respectively, call number CLIP.

The call charge calculation in the versions according to FIGS. 2b and 2c is implemented using the communicated CLIP. The calculation of the routing charges for a routing of communication connections KV in the corporate network CN is determined independently of the determination of the call charges in the ISDN communication network ISDN in the respective local areas. In the exemplary embodiment, local area charges for the two local areas and charges for the routing via the corporate network respectively derive.

Figure 3:
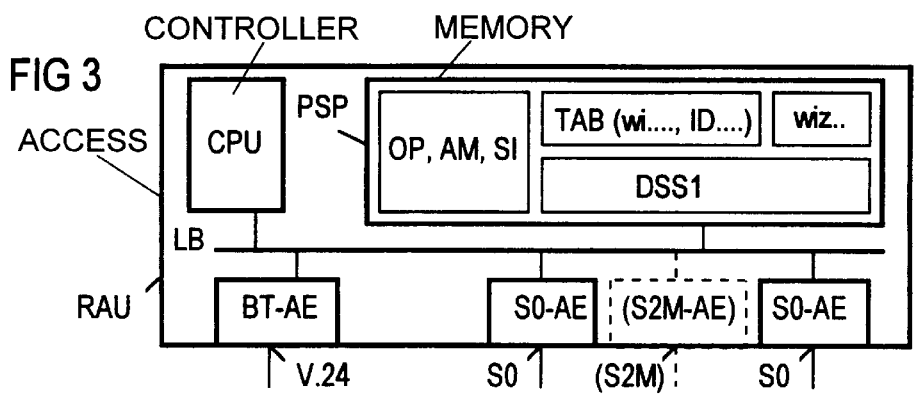
FIG. 3 is a block circuit diagram showing the structure of a network access means.

FIG. 3 shows a block circuit diagram of the network access means RAU in which a controller CPU, two ISDN basic terminal units S0-AE, an administration and maintenance terminal unit BT-AE as well as a program memory PSP are connected to a shared, local bus LB. Alternatively, an ISDN primary terminal unit S2M-AE can be utilized instead of the two ISDN basic terminal units S0-AE (indicated by the designation (S2M-AE) and broken lines). The controller CPU has a main memory (not shown) allocated to it. The controller CPU is realized, for example, by a microprocessor system, whereby the local bus LB is formed by the microprocessor bus.

Layer 1 (physical layer) and layer 2 (protection layer) of an ISDN basic interface S0 or of an ISDN primary interface (S2M) respectively realized in the ISDN basic terminal units S0-AE or, respectively, the ISDN primary terminal unit S2M-AE. Further, a program structure for the operation OP, the administration AM and the dependability monitoring of the network access means RAU is provided in the program memory PSP. The layer-3 messages or, respectively, information are conducted from the ISDN basic interfaces S0 or, respectively, from the ISDN primary terminal unit (S2M-AE) to the controller CPU and are processed thereat using a program structure DSS1stored in the program memory PSP. In particular, the indicated selection information or, respectively, destination selection information wi as well as identification information ID are stored in a table TAB of the program memory PSP. In particular, the indicated selection information wi are a mater of the selection information or, respectively, parts of selection information Wi of called communication terminal equipment KE that are arranged in the corporate network CN or in the long-distance area FB of the ISDN communication network ISDN and that are routed via the corporate network CN. The interpretations of indicated selection information or, respectively, destination selection information wi communicated in the framework of a connection setup are undertaken with the assistance of the selection information wi stored in the table TAB (particularly the selection information defining the long-distance area part, 089 in the exemplary embodiment), that is, when the communicated, indicated selection information wi agrees with a stored selection information wi, for example 089-722-, then the incoming communication connection KV is routed via the ISDN communication network ISDN to the corporate network CN. The administration and maintenance terminal unit BT-AE realizes a V.24 interface V.24 to which an administration and maintenance terminal (not shown) can be connected on site for the purpose of operation and maintenance of the network access means RAU. A remote maintenance or, respectively, a remote operation of the network access means RAU from the remote communication system AKS is possible via the at least one ISDN basic terminal S0. A communication, modification and storing of selection information wi entered in the table TAB is also possible within the scope of this remote operation, as a result whereof the table TAB can be adapted to the current demands in the most comfortable way. Other selection information wiz that can be remotely administered are also stored in the memory PSP, these being provided for a targeted connection setup to the communication terminal KA to which the allocated network logon means DIS are connected.

Figure 4:
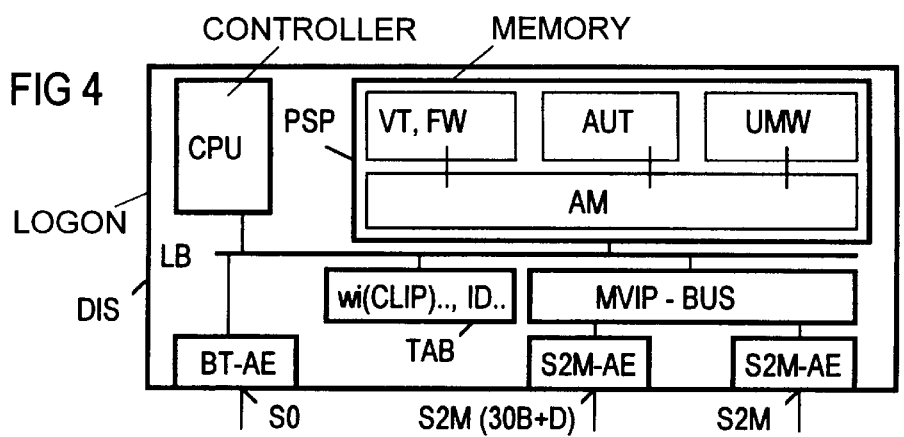
FIG. 4 depicts the structure of a network logon means.

FIG. 4 shows a block circuit diagram of a development of a network logon means DIS in which a local bus LB is connected to a controller CPU, a program memory PSP, an administration and maintenance terminal unit BT-AE and to a multi-vendor integration protocol bus MVIP-bus to which an ISDN primary terminal unit S2MAE respectively realizing an ISDN primary terminal S2M is connected. The multi-vendor integration protocol bus MVIP-bus realizes a multi-vendor integration protocol (referenced MVIP subsequently) and a physical bus with which 256 64 kbit/s channels can be transmitted or, respectively, controlled on eight serial channels of 2048 kbit/s each. This MVIP bus is particularly suited for the connection of ISDN terminal units AE (for example, ISDN basic or ISDN primary terminal units S0-AE, S2M-AE) and for their connection to one another.

An ISDN primary terminal S2M comprises thirty message channels B with 64 kbit/s each and a signaling channel B with 16 kbit/s. Thirty communication connections KV, including the allocated ISDN signaling, can thus be communicated via such an ISDN primary terminal S2M. This means that the corporate network CN is connected to the ISDN communication network ISDN over thirty message channels B over which up to thirty communication connections KV can arrive. Given a substantially lower number of anticipated communication connections KV to be routed, one or more ISDN basic terminal units S0-AE can be integrated instead of the ISDN primary terminal unit S2M-AE. These ISDN basic terminal units S0-AE are directly connected to the local bus LB, whereby the MVIP bus is eliminated. The administration and maintenance terminal unit BT-AE that realizes a further S0 interface S0 is used in the same way as in the network access means RAU.

The control means CPU, advantageously realized by a microprocessor system, control the network logon means DIS using the program structures implemented in the program memory PSP and via the local bus LB realized as a microprocessor bus. An administration and maintenance program structure AM administers a switching-oriented program structure VT, FW, an authorization program structure AUT and a conversion program structure UMW. The switching-oriented program structure VT, FW is provided for the routing of the incoming communication connections KV or, respectively, for the layer-3 protocol control of the outgoing and incoming communication connections KV. Further, the switching-oriented program structure VT, FW carries out the procedural control of a remote maintenance function FW that, in particular, is implemented by a communication system KS integrated in the corporate network CN. The selection information wi . . . stored in a table TAB as well as identification information ID . . . and the further selection information wiz can be updated via this remote maintenance function FW, that is, they are deleted, modified or newly added.

Using the authorization program structure AUT, the communicated selection information of the calling communication terminal equipment Ke1 . . . n, that is the CLIPs, are compared to the CLIPs stored in the table TAB and, given coincidence, a connection setup to the corporate network CN is initiated for the incoming information connection KV.

Using the conversion program structure UMW, the communication connections KV to be routed via the corporate network CN to a further ISDN communication terminal KA(w) are converted, that is, the communicated destination information DEST is replaced by a destination information DEST that is inserted into the ISDN signaling. Using the ISDN signaling the communication connection is routed to a further communication terminal KA(w) of the ISDN communication network ISDN. This development of the present invention is particularly provided for communication connections KV that are routed from a local area via the corporate network CN into a long-distance area (for example, from Munich to Düsseldorf or to a long-distance area in the USA as well) for reasons of savings in call charges. A routing of communication connections KV via corporate networks CN can be more cost-beneficial and, thus, more economical precisely in the case of long-distance connections.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for controlling communication connections between at least one first communication network and remote communication systems connected to communication terminal equipment, via a second communication network, comprising the steps of:

initiating a connection setup via the remote communication system by a respective communication terminal equipment thereof, the respective communication terminal equipment indicating selection information;

evaluating the indicated selection information and providing an evaluation result, thereof;

dependent on the evaluation result effecting one of the following, setting up a communication connection to the second communication network with the indicated selection information, or deriving an additional, predetermined selection information from the indicated selection information, with which a connection is set up via the second communication network to the at least one first communication network, the indicated selection information being communicated to the at least one first communication network in a selection information sub-field of a signaling in the connection setup.

2. The method according to claim 1, wherein the at least one first communication network is a private communication network and the second communication network is an ISDN communication network, whereby the signaling corresponds to ISDN signaling.

3. The method according to claim 2, wherein the ISDN signaling is realized according to standardized Euro-ISDN signaling, the indicated selection information being communicated in a sub-addressing of the Euro-ISDN signaling.

4. The method according to claim 1, wherein the method further comprises:

checking the communication network access authorization of the respective incoming communication connection in the at least one first communication network using the communicated selection information of the calling communication terminal equipment connected to the remote communication system;

setting up, given confirmed authorization, the incoming communication connection and, for further routing, communicating the indicated selection information to the at least one communication network; and rejecting when authorization is not confirmed, the incoming communication connection.

5. The method according to claim 1, wherein the method further comprises:

communicating, in addition to the indicated selection information identification information in the selection information sub-field of the signaling;

additionally checking authorization of a respective incoming communication connection in the at least one first communication network using the communicated identification information;

setting up, when authorization is confirmed, the incoming communication connection and, for further routing, communicating the indicated selection information to the at least one communication network; and rejecting, when authorization is not confirmed, the incoming communication connection.

6. The method according to claim 1, wherein the method further comprises, in the remote communication systems;

storing information indicating internal selection information allocated to the at least one first communication network;

comparing, in a connection setup, the indicated selection information to the stored information and providing a comparison result; and setting up, given a comparison result indicating an internal selection information, a communication connection via the second communication network to the at least one first communication network.

7. The method according to claim 1, wherein in the remote communication systems the method further comprises:

storing further selection information for communication terminal equipment to which a communication connection is routed via the at least one first communication network for saving call charges;

comparing, given a connection setup, the indicated selection information to the further selection information and, given a coincidence thereof, setting up the communication connection to the at least one first communication network via the second communication network.

8. The method according to claim 1, wherein communication connections from remote communication systems are set up to communication terminals of the at least one first communication network that are defined by the predetermined selection information.

9. The method according to claim 1, wherein the indicated selection information communicated in the selection information sub-field is evaluated in the at least one first communication network and, after determining internal selection information, the respective communication connection is routed to an appertaining communication terminal equipment of the first communication network.

10. The method according to claim 1, wherein the indicated selection information communicated in the selection information sub-field is evaluated in the at least one first communication network and, after determining external selection information, the respective communication connection is routed via the respective first communication network to a further communication terminal in a destination area of the second communication network that is defined by the indicated selection information.

11. A network access apparatus with at least one communication terminal to a remote communication system and at least one communication terminal to a second communication network, comprising:

system for evaluating selection information indicated in a setup of communication connections initiated by the remote communication system and for activating further systems dependent on an evaluation result, thereof;

system for setup of communication connections to the second communication network using the evaluated indicated selection information; and system for deriving additional predetermined selection information from the evaluated indicated selection information, and system for setup of communication connections to at least one first communication network using the additional selection information, the indicated selection information being communicated to the at least one first communication network in a selection information sub-field of a signaling during the connection setup.

12. The network access apparatus according to claim 11, wherein the communication network terminals are ISDN communication terminals with an ISDN signaling according to standardized Euro-ISDN signaling, the indicated selection information being communicated in a sub-addressing of the Euro-ISDN signaling.

13. The network access apparatus according to claim 11, wherein the apparatus further comprises systems for inserting stored, additional identification information into the selection information sub-field of the signaling.

14. The network access apparatus according to claim 11, wherein the apparatus further comprises:

system for storing information representing internal selection information allocated to the at least one first communication network;

system for comparing the selection information indicated given a connection setup to the information; and system for setting up a communication connection to the at least one first communication network given a comparison result indicating an internal selection information.

15. The network access apparatus according to claim 11, wherein the apparatus further comprises:

system for storing further selection information of communication terminal equipment to which a communication connection is routed via the at least one first communication network for saving call charges;

system for comparing respective selection information indicated in a connection setup to the further selection information; and system for setup of a communication connection to the at least one first communication network given a coincidence of the selection information.

16. A network access apparatus with at least one communication terminal to a remote communication system and at least one communication terminal to a second communication network, comprising:

system for evaluating selection information indicated in a setup of communication connections initiated by the remote communication system and for activating further systems dependent on an evaluation result, thereof;

system for setup of communication connections to the second communication network using the evaluated indicated selection information;

system for deriving additional predetermined selection information from the evaluated indicated selection information, and system for setup of communication connections to at least one first communication network using the additional selection information, the indicated selection information being communicated to the at least one first communication network in a selection information sub-field of a signaling during the connection setup; and at least one communication terminal to the remote communication system is at least one of the Euro-ISDN communication terminal, an ISDN primary terminal and an analog communication terminal.

17. The network access apparatus according to claim 16, wherein the apparatus further comprises:

at least one terminal unit that is connected to an administration and maintenance terminal unit; and a control unit having a program structure realizing switching-oriented layer-3 functions, having a program structure realizing administration and maintenance administration and control, and having a table that stores the internal and external selection information as well as identification information.

18. The network access apparatus according to claim 17, wherein the terminal unit is at least two ISDN basic terminal units realizing layer 1 and 2 of an ISDN basic terminal.

19. The network access apparatus according to claim 17, wherein the terminal unit is an ISDN primary terminal unit realizing an ISDN primary terminal.

20. The network access apparatus according to claim 17, wherein the terminal unit is formed by an HKZ terminal unit realizing an analog HKZ terminal.

21. A network access device with at least respectively one communication terminal connected to first and second communication networks, the device further comprising:

system for checking respectively transmitted dial information of a communication connection incoming from the second communication network for a communication network authorization;

system for forwarding the respective incoming communication connection with the transmitted dial when authorization is not confirmed;

system for rejecting the incoming communication connection when authorization is not confirmed;

a plurality of terminal units and a control unit that is connected to all units:

the control unit having a message switching technology-program structure for switching oriented control of the communication connections;

the control unit having an authorization-program structure for checking communication connections that are incoming from the second communication network;

the control unit having a translation-program structure for translation of selection information that is transmitted, indicated in a sub-selection information field of the selection information;

the control unit having an administration technology-program structure for administration of all program structures; and the control unit having a storage for storage of internal selection information and external selection information.

22. The network logon apparatus according to claim 21, wherein the terminal unit is at least two ISDN primary terminal units respectively realizing an ISDN primary terminal that are connected to one another via a multi-vendor integration protocol bus realizing a multi-vendor integration protocol.

23. The network logon apparatus according to claim 21, wherein the terminal unit is formed by a plurality of ISDN basic terminal units respectively realizing an ISDN basic terminal.

24. The network access device according to claim 21, wherein the access device further comprises:

system for checking identification information that is additionally transmitted in the sub-selection information field for additional authorization checking;

system for setup of a respectively incoming communication connection in at least one, first communication network with the transmitted, indicated selection information when authorization has been found; and system for rejecting the respectively incoming communication connection when authorization has not been found.

* * * * *